(12) United States Patent
Puttaswamy Naga et al.

(10) Patent No.: US 9,444,840 B2
(45) Date of Patent: Sep. 13, 2016

(54) METHOD AND APPARATUS FOR A DISTRIBUTED SECURITY SERVICE IN A CLOUD NETWORK

(75) Inventors: Krishna P. Puttaswamy Naga, Edison, NJ (US); Thyagarajan Nandagopal, Herndon, VA (US)

(73) Assignee: Alcatel Lucent, Boulogne-Billancourt (FR)

( * ) Notice: Subject to any disclaimer, the term of this patent is extended or adjusted under 35 U.S.C. 154(b) by 713 days.

(21) Appl. No.: 13/418,463

(22) Filed: Mar. 13, 2012

(65) Prior Publication Data
US 2013/0247134 A1    Sep. 19, 2013

(51) Int. Cl.
*H04L 29/06*    (2006.01)
(52) U.S. Cl.
CPC ........... *H04L 63/20* (2013.01); *H04L 63/0218* (2013.01)
(58) Field of Classification Search
CPC .. H04L 63/20; H04L 63/2018; H04L 63/107
USPC ....................................................... 726/1, 22
See application file for complete search history.

(56) References Cited

U.S. PATENT DOCUMENTS

| | | | |
|---|---|---|---|
| 7,849,502 B1 * | 12/2010 | Bloch et al. ..................... | 726/11 |
| 2003/0126468 A1 | 7/2003 | Markham | |
| 2006/0130147 A1 * | 6/2006 | Von-Maszewski ......... | H04L 63/1408 726/25 |
| 2009/0178111 A1 * | 7/2009 | Moriconi et al. ................. | 726/1 |
| 2011/0231892 A1 * | 9/2011 | Tovar ............................... | 726/1 |
| 2011/0247047 A1 | 10/2011 | Loureiro et al. | |

FOREIGN PATENT DOCUMENTS

| | | |
|---|---|---|
| CN | 155611 A | 12/2004 |
| CN | 1604541 A | 4/2005 |
| CN | 1787529 A | 6/2006 |
| CN | 101111053 A | 1/2008 |
| CN | 101605066 A | 12/2009 |
| CN | 101730903 A | 6/2010 |
| JP | 2009522672 A | 6/2009 |
| WO | WO2008023423 A1 | 2/2008 |
| WO | PCT/US2013/025493 | 4/2013 |

OTHER PUBLICATIONS

Oberheide, J. et al: "CloudAV: N-Version Antivirus in the Network Cloud", USENIX Association, 17th USENIX Security Symposium, 2008, pp. 91-106, Electrical Engineering and Computer Science Department, University of Michigan, Ann Arbor, MI.

* cited by examiner

*Primary Examiner* — Ellen Tran
(74) *Attorney, Agent, or Firm* — Steven R. Santema

(57) ABSTRACT

Various embodiments provide a method and apparatus of providing a distributed security service that runs light instances in a number of security devices and central instances of the security services in select security devices. A received or transmitted client content segment is directed to a light instance which either applies a security policy corresponding to the client content segment if the client content segment has been previously analyzed and has a valid security policy, or else, the light instance sends the client content segment to a central instance to be analyzed. The central instance may then provide a complete security analysis on the client content segment, determine a security policy corresponding to the client content segment and push the determined security policy to one or more of the light instances. Advantageously, a distributed security service delivery may provide highly secure, network efficient and cost effective security service delivery.

22 Claims, 6 Drawing Sheets

METHOD AND APPARATUS FOR A DISTRIBUTED SECURITY SERVICE IN A CLOUD NETWORK

TECHNICAL FIELD

The invention relates generally to methods and apparatus for providing security services in cloud networks.

BACKGROUND

This section introduces aspects that may be helpful in facilitating a better understanding of the inventions. Accordingly, the statements of this section are to be read in this light and are not to be understood as admissions about what is in the prior art or what is not in the prior art.

In some known security schemes, anti-virus and anti-malware applications are stored on a user's computing device or at the network edge to secure the computing device from malware infection and other attacks.

In some other known security schemes, multiple instances of anti-virus and anti-malware services are positioned in the cloud and traffic from a user's computing device is routed via the cloud to the anti-virus and anti-malware instances to secure the computing device from malware infection and other attacks.

SUMMARY

Various embodiments provide a method and apparatus of providing a distributed security service that runs light-weight security instances (i.e., light instances) in a number of security devices and complete security instances (i.e., central instances) of the security services in select security devices. A received or transmitted client content segment is directed to a light instance which either applies a security policy corresponding to the client content segment if the client content segment has been previously analyzed and has a valid security policy, or else, sends the client content segment to a central instance to be analyzed. The central instance may then provide a complete security analysis on the client content segment, determine a security policy corresponding to the client content segment and push the determined security policy to one or more of the light instances. Advantageously, distributed security service delivery may provide a highly secure, network efficient and cost effective security service.

In one embodiment, an apparatus is provided for providing distributed security service delivery. The apparatus includes a data storage and a processor communicatively coupled to the data storage. The processor is configured to store a plurality of security policies corresponding to a plurality of client content segments in the data storage, receive a first client content segment, determine a first client content segment identifier based on the content of the first client content segment, select a first security policy from the plurality of security policies based on the first client content segment identifier, apply the first security policy to the first client content segment, receive a second client content segment, determine a second client content segment identifier based on the content of the second client content segment, determine that the plurality of security policies does not contain a valid security policy for the second client content segment based on the second client content segment identifier, and send a security analysis request to a central instance in response to the determination that the plurality of security policies does not contain the valid security policy.

In some embodiments, the first security policy comprises at least one of: admit, decline or quarantine the first client content segment.

In some embodiments, the determination of the first client content segment identifier includes programming the processor to apply a hash computation on the first client content segment.

In some embodiments, the application of the first security policy includes programming the processor to send a client a message based on the first security policy.

In some embodiments, the application of the first security policy includes programming the processor to send a client a message based on the first security policy, receive a client response, and admit or decline the client content segment based on the client response. Where the first security policy includes a warning of a potential security risk.

In some embodiments, the processor is further programmed to: divide the first client content segment into a plurality of divided first client content segments. Where the first client content segment identifier corresponds to one of the plurality of divided first client content segments.

In some embodiments, the division of the first client content segment is based on dynamic content.

In some embodiments, the processor is further programmed to: receive a central instance response from the central instance, determine a second security policy based on the central instance response, and apply the second security policy to the second client content segment.

In some embodiments, the processor is further programmed to: apply an expiration policy on the plurality of security policies, and further base the determination that the plurality of security policies does not contain a valid security policy based on the expiration policy.

In some embodiments, the expiration policy is based on the source of the second client content segment.

In some embodiments, the processor is further programmed to: receive an update message from the central instance, and update the plurality of security policies based on the update message.

In some embodiments, the processor is further programmed to: update the plurality of security policies based on one or more preservation metrics. The one or more preservation metrics including at least one of: an occupied storage space of plurality of security policies in the data storage, a geographic categorization of the client content segment corresponding to the plurality of security policies, a source of the client content segment corresponding to the plurality of security policies, and a determination of the probability that the client content segment corresponding to the plurality of security policies will be received in the future.

In a second embodiment, an apparatus is provided for providing distributed security service delivery. The apparatus includes a data storage and a processor communicatively coupled to the data storage. The processor is configured to receive a request to analyze a client content segment, perform a security analysis of the client content segment, determine a central instance policy based on the security analysis, determine a plurality of light instances, and transmit an update message to the plurality of light instances, the update message comprising the central instance policy.

In some embodiments, the central instance policy includes at least one of: a security policy to apply to the client content segment, and a security risk of the client content segment.

In some embodiments, the security risk is a security risk rating.

In some embodiments, the determination of the plurality of light instances is based on a categorization of the content of the client content segment.

In some embodiments, the determination of the plurality of light instances is based on a plurality of geographic locations corresponding to the plurality of light instances.

In some embodiments, the update message further comprises at least one of: a client content segment identifier, an expiration parameters corresponding to the central instance policy, and a content type of the client content segment.

In a third embodiment, a system is provided for providing a security service. The system includes: a plurality of light instances and a central instance communicatively coupled to the plurality of light instances. The plurality of light instances are programmed to: store a plurality of security policies corresponding to a plurality of client content segments, receive a first client content segment, determine a first client content segment identifier based on the content of the first client content segment, select a first security policy from the plurality of security policies based on the first client content segment identifier, apply the first security policy to the first client content segment, receive a second client content segment, determine a second client content segment identifier based on the content of the second client content segment, determine that the plurality of security policies does not contain a valid security policy for the second client content segment based on the second client content segment identifier, and send a security analysis request to the central instance in response to the determination that the plurality of security policies does not contain the valid security policy. The central instance is programmed to: receive the security analysis request, perform a security analysis of the client content segment, determine a central instance policy based on the security analysis, determine a plurality of light instances, and transmit an update message to the plurality of light instances, the update message comprising the central instance policy.

In a fourth embodiment, a method is provided for providing a security service. The method includes: storing a plurality of security policies corresponding to a plurality of client content segment in the data storage, receiving a first client content segment, determining a first client content segment identifier based on the content of the first client content segment, selecting a first security policy from the plurality of security policies based on the first client content segment identifier, applying the first security policy to the first client content segment, receiving second client content segment, determining a second client content segment identifier based on the content of the second client content segment, determining that the plurality of security policies does not contain a valid security policy for the second client content segment based on the second client content segment identifier, and sending a security analysis request to a central instance in response to the determination that the plurality of security policies does not contain the valid security policy.

In some embodiments, the first security policy comprises at least one of admit, decline or quarantine the first client content segment.

In some embodiments, the step of determining the first client content segment identifier includes applying a hash computation on the first client content segment.

BRIEF DESCRIPTION OF THE DRAWINGS

Various embodiments are illustrated in the accompanying drawings, in which.

To facilitate understanding, identical reference numerals have been used to designate elements having substantially the same or similar structure or substantially the same or similar function.

DETAILED DESCRIPTION OF ILLUSTRATIVE EMBODIMENTS

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

Various embodiments provide a method and apparatus of providing a distributed security service that runs light instances in a number of security devices and central instances of the security services in select security devices. A received or transmitted client content segment is directed to a light instance which either applies a security policy corresponding to the client content segment if the client content segment has been previously analyzed and has a valid security policy, or else, sends the client content segment to a central instance to be analyzed. The central instance may then provide a complete security analysis on the client content segment, determine a security policy corresponding to the client content segment and push the determined security policy to one or more of the light instances.

Figure 1:
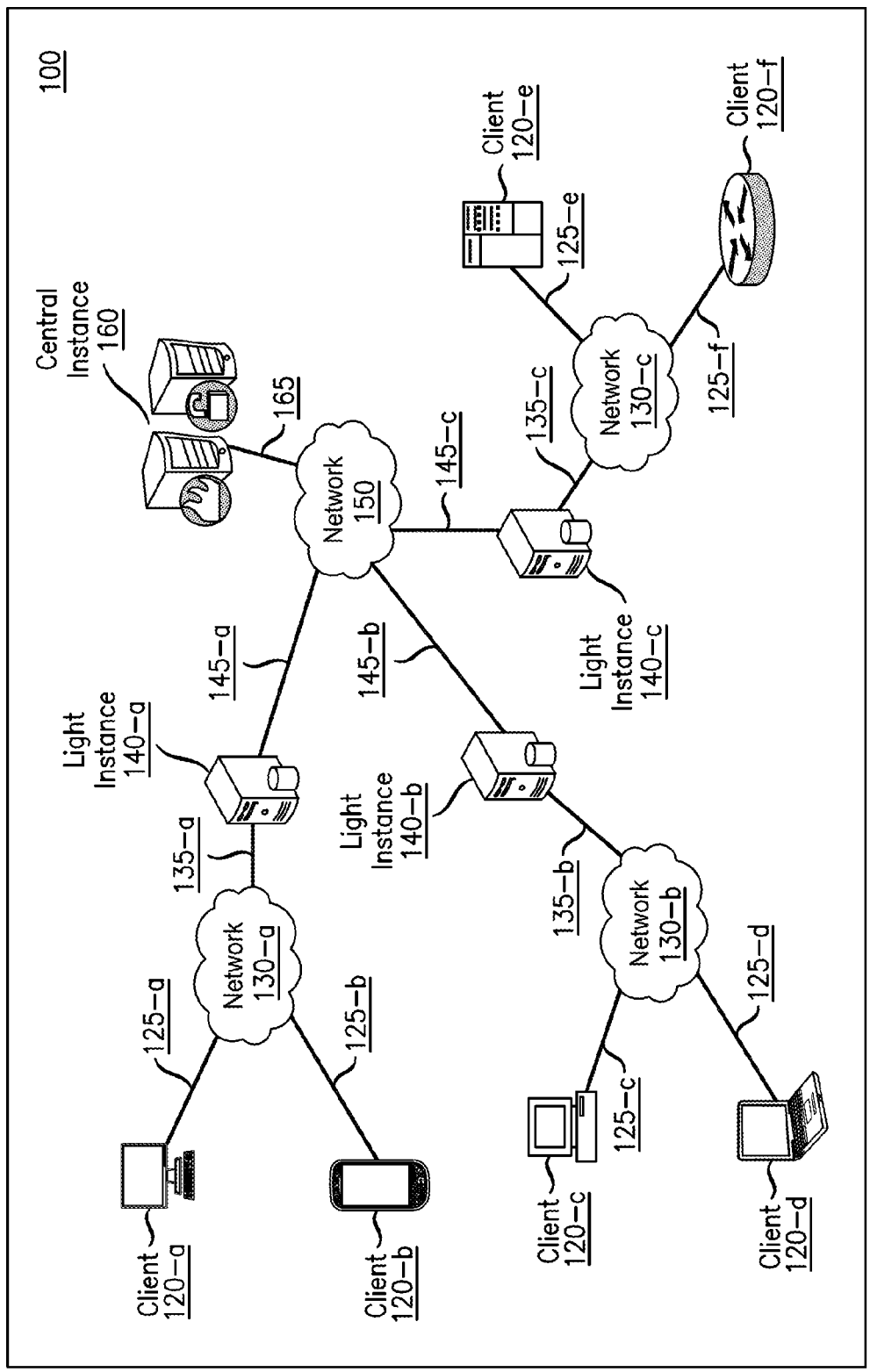
FIG. 1 illustrates a cloud network that includes an embodiment of the distributed security service delivery architecture 100.

FIG. 1 illustrates a cloud network that includes an embodiment of the distributed security service delivery architecture 100. The distributed security service delivery architecture 100 includes one or more clients 120-a-120-g (collectively, clients 120) that send or receive a client content segment via one of light instances 140-a-140-c (collectively, light instances 140) over a client communication path. The client communication path may include one of client communication channels 125-a-125-g (collectively, client communication channels 125), one of client networks 130-a-130-c (collectively, client networks 130), and one of client facing light instance communication channels 135-a-135-c (collectively, client facing light instance communication channels 135). If the corresponding one of light instances 140 is unable to identify a security policy to apply to the client content segment, the corresponding one of light instances 140 sends the client content segment over a central instance communication path to the central instance 160 to perform a complete security analysis of the client content segment. The central instance communication path may include one of central instance facing light instance communication channels 145-a-145-g (collectively, central instance facing light instance communication channels 125), central instance network 150, and central instance communication channel 165.

The term "client content segment" as used herein should be understood broadly as including any content capable of being transmitted or received over client communication channels 125. For example, a client content segment may be a packet, a stream of packets, a file, file blocks, digital document, any portion of the aforementioned, or the like.

The clients 120 may be any type or number of client machine(s) capable of sending or receiving one or more client content segments over one or more of communication channels 125. For example, clients 120 may be a thin client (e.g., client 120-a), a smart phone (e.g., client 120-b), a personal or laptop computer (e.g., clients 120-c and 120-d respectively), server (e.g., client 120-e), network device (e.g., client 120-f), tablet, television set-top box, or the like. Clients 120 may rely on other resources within exemplary system to perform a portion of tasks, such as processing or storage, or may be capable of independently performing tasks.

The communication channels 125, 135, 145 and 165 support communicating over one or more communication channels such as: wireless communications (e.g., LTE, GSM, CDMA, bluetooth); femtocell communications (e.g., WiFi); packet network communications (e.g., IP); broadband communications (e.g., DOCSIS and DSL); storage communications (e.g., Fibre Channel, iSCSI) and the like. It should be appreciated that though depicted as a single connection, communication channels 125, 135, 145 and 165 may be any number or combinations of communication channels.

The client networks 130 and central instance network 150 may be a device or group of devices adapted to provide communication between other devices (e.g., clients 120, light instances 140 or central instance 160) of exemplary system 100. For example, networks 130 and central instance network 150 may be any combination and any number of wireless, wire line or femtocell networks including: LTE, GSM, CDMA, Local Area Network(s) (LAN), Wireless Local Area Network(s) (WLAN), Wide Area Network (WAN), Metropolitan Area Network (MAN), or the like.

The light instances 140 may be any apparatus applying a light-weight instance of the security service against the client content segment. In particular, a light-weight instance determines whether the client content segment has been previously analyzed and the light instance has stored a valid security policy corresponding to the client content segment. If the light instance has a corresponding and valid security policy, the light instance applies the stored security policy, or else, the light instance sends a request to the central server 160 to analyze the client content segment. The stored security policy is based on a security policy established as a result of a prior security analysis of the client content segment (e.g., an analysis performed by central instance 160). It should be appreciate that while three light instances are illustrated here, system 100 may include fewer or more light instances.

The central instance 160 may be any apparatus applying a complete security service instance against the client content segment. In particular, the complete security service instance analyzes the client content segment to determine whether the client content segment potentially contains a security risk and sends a central instance policy based on the determination to one or more of the light instances 140. It should be appreciate that while one central instance is illustrated here, system 100 may include more central instances.

In some embodiments, one or more client networks 130 or central instance network 150 may share portions of, or an entire network. For example, network 130-a and network 150 may be the same network even though they are depicted as two separate networks for illustrative purposes. In a further embodiment of this embodiment, one of client facing light instance communication channels 135 and a corresponding one of the central instance facing light instance communication channels 145 may be the same communication channel even though they are depicted as separate communication channels for illustrative purposes. For example, if network 130-a and network 150 include a portion of, or an entire shared network, client facing light instance communication channel 135-a and central instance facing light instance communication channel 145-a may be the same communication channel and consequently, light instance 140-a may include only one I/O interface to communicate over both communication channels.

In some embodiments, one ore more of the light instances 140 or central instance 160 is a data center. In some of these embodiments, the data center contains resources which comprise one or more virtual machines running the light-weight security instance(s) or complete security instance as appropriate.

In some embodiments, one or more of the light instances 140 or central instance 160 are devices in one of client networks 130 or central network 150. For example, light instance 140-a may be an edge device within network 130-a.

In some embodiments, the light instances 140 are geographically distributed. In a further embodiment of this embodiment, the client content segment is routed via the light instance closest to the sending/receiving client. Advantageously, network bottlenecks and delays may be avoided by routing a client content segment through the closest light instance. It should be appreciated that the proximity of a light instance to a client may be determined through any suitable metric such as: physical distance, network metrics (e.g., latency, cost, or QoS guarantees), type of data, service provider, or the like.

Figure 2:
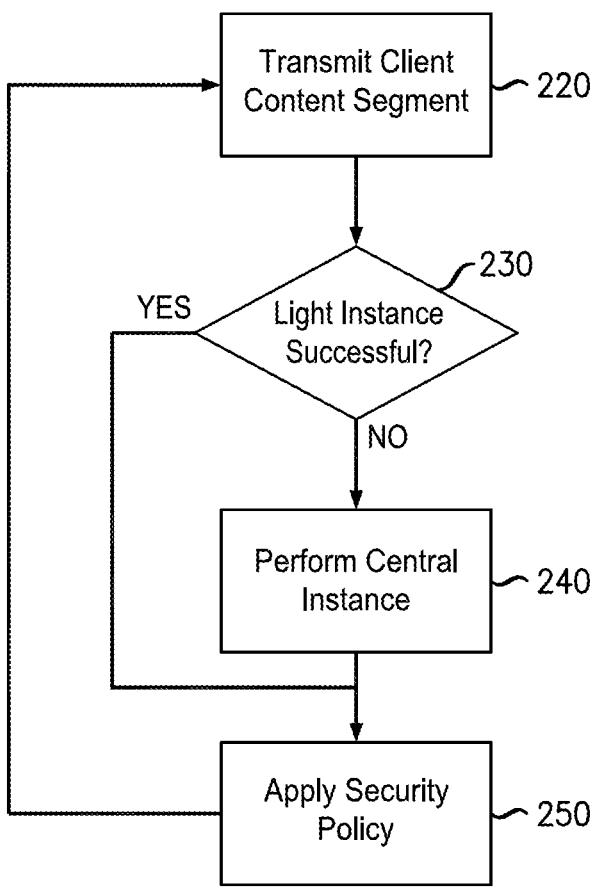
FIG. 2 depicts a flow chart illustrating an embodiment of a method 200 for providing distributed security servicer delivery in cloud networks.

FIG. 2 depicts a flow chart illustrating an embodiment of a method 200 for providing a distributed security service in cloud networks.

In the method 200, the step 220 includes transmitting a client content segment from a client (e.g., one of clients 120 of FIG. 1) to a light instance (e.g., one of light instances 140 of FIG. 1). In particular, a client content segment sent or received by a client is directed through a light instance to perform the security service.

In the method 200, the step 230 includes a light instance (e.g., one of light instances 140 of FIG. 1) applying a light-weight instance of the security service against the client content segment. In particular, the light-weight instance of the security service determines a client content segment identifier for the client content segment. Based on the client content segment identifier, the light instance then determines whether the light instance has a valid security policy stored for the client content segment. If the light instance does not have a valid security policy, the method proceeds to step 240, else the method proceeds to step 250. Advantageously, by using a client content segment identifier to retrieve a stored security policy corresponding to the client content segment, a light instance may decrease installation, maintenance (e.g., updates), and software costs, since the light instance does not require purchase, installation and maintenance of security software on each light instance. Moreover, the system may still provide high security as the stored security policy is based on a full analysis of the client content segment (e.g., by central instance 160).

In the method 200, the step 240 includes performing the security service by the central instance (e.g., by central instance 160 of FIG. 1). In particular, the complete security service instance analyzes the client content segment to determine whether the client content segment potentially contains a security risk and updates one or more of the light instances 140 based on the determined security risk.

In the method 200, the step 250 includes applying the stored security policy from step 230 or applying a security policy based on the security details retrieved from step 240.

In a first embodiment of the step 250, the security policy may be applied at the light instance (e.g., light instance 140-a of FIG. 1). In a second embodiment, the security policy may be applied at the client (e.g., client 120-a of FIG. 1).

In some embodiments, the step 220 includes directing the client content segment to the nearest light instance as described above in FIG. 1.

In some embodiments, the step 220 includes an outward-looking light instance that determines whether client content segments coming into a client's network contains a security risk.

In some embodiments, a client content segment is a website or a portion thereof. For example, a client (e.g., one of clients 120 of FIG. 1) may visit a website such as www.alcatel-lucent.com and the contents of the web page may be the client content segment.

In some embodiments, a client content segment may be divided into more than one client content segment. For example, the website www.alcatel-lucent.com may include three iFrames pointing to a three different websites. The content from each of the three websites may be separate and thusly, the light instance may handle each of the three websites as separate client content segments. In another example, a client content segment may be broken into a number of content components such as images, HTML files, java applets or the like. In this example, the light instance may handle each of these content components as separate client content segments. In a further embodiment of this embodiment, the division of a client content segment may be based on the dynamic nature of the content. For example, dynamic content, such as fill in form sections of a web page or ads on web pages, may be broken out into separate client content segments. It should be appreciate that by breaking out dynamic content from the client content segment, there may be a higher likelihood that the light instance will have a stored security policy for the non-dynamic client content segment.

In some embodiments of the step 240, the security service is an anti-virus or anti-malware (AVAM) service.

In some embodiments of the step 240, the security service includes more than one software program. In a further embodiment, the security service includes software programs from more than one vendor. Advantageously, by using multiple different software programs, a higher level of security may be provided as compared to examining the client content segment by only one software program or one vendor's software program.

In some embodiments of the step 250, the security policy is a decision to admit, decline, or quarantine the client content segment. In some embodiments of the step 250, the security policy includes providing information to the client of the actions taken or a warning that the client content segment provides a potential security risk.

In some embodiments, the step 250 includes a client acceptance to admit the client content segment. For example, for a security policy providing information to the client of a potential security risk of an incoming client content segment may allow a client to accept the client content segment after receiving the security policy warning. In a further embodiment, the client may store his acceptance or rejection of the client content segment. In some of these embodiments, the stored acceptance or rejection may be used to automate acceptance or rejection of the client content segment at a future time. The acceptance or rejection may be stored at a client (e.g., client 120-a of FIG. 1), a light instance (e.g., light instance 140-a of FIG. 1) or a central instance (e.g., central instance 160 of FIG. 1).

Figure 3:
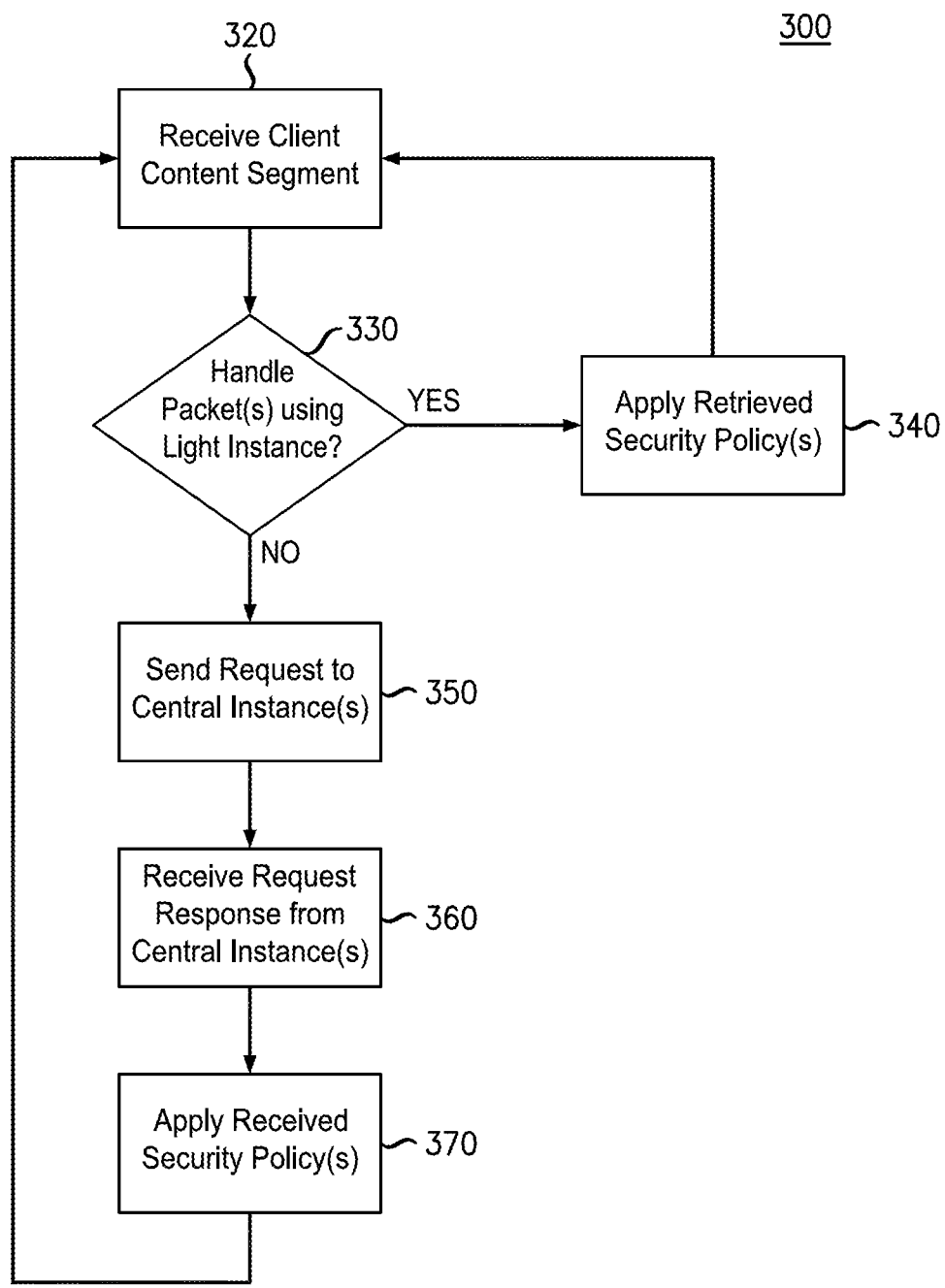
FIG. 3 depicts a flow chart illustrating an embodiment of a method 300 for a light instance (e.g., one of light instances 140 of FIG. 1) to apply a light-weight security instance on a client content segment as illustrated in step 230 of FIG. 2.

FIG. 3 depicts a flow chart illustrating an embodiment of a method 300 for a light instance (e.g., one of light instances 140 of FIG. 1) to apply a light-weight security instance on a client content segment as illustrated in step 230 of FIG. 2. The method includes receiving a client content segment (step 320), such as captured during step 220 in FIG. 2. The apparatus performing the method then determines whether the received client content segment has a stored security policy (step 330) and if so, applies the security policy (step 340), or else, the apparatus sends a request to perform a security analysis of the client content segment to a central instance (e.g., central instance 160 of FIG. 1) (step 350). The apparatus performing the method then optionally receives a request response containing a central instance policy corresponding to the client content segment from the central instance (step 360) and applies a security policy based on the central instance policy (step 370).

In the method 300, the step 320 includes receiving a client content segment from a client (e.g., one of clients 140 of FIG. 1).

In the method 300, the step 330 includes determining whether the received client content segment has a stored security policy. In particular, a client content segment identifier that may be used to identify the content of the client content segment is determined. The client content segment identifier is then used to determine if a stored security policy exists corresponding to the client content segment identifier. Optionally, the step 330 may also include determining whether the stored security policy is valid. If the light instance determines that a stored and valid security policy exists, the method proceeds to step 340, or else, the method proceeds to step 350.

In the method 300, step 340 includes applying the security policy retrieved in step 330. The light instance may directly apply the security policy against the client content segment or indirectly apply the security policy by sending a light instance security message based on the security policy to the client instructing the client to control the security policy to apply to the client content segment.

In the method 300, step 350 includes sending a request to a central instance to perform a security analysis of the client content segment. In particular, for client content segment without a stored and valid security policy, the light instance sends the client content segment to the central instance for evaluation.

The method 300 optionally includes step 360. Step 360 includes receiving a response from the central instance to the request sent in step 350. The central instance response contains a central instance policy corresponding to the client content segment.

The method 300 optionally includes step 370. Step 370 includes applying a security policy based on the central instance response received in step 360 as described above in step 340. It should be appreciated that in some embodiments the central instance may send the security policy directly to the client.

In some embodiments, the step 330 includes directing the method to perform both steps 340 and 350. For example, the light instance may use an expired security policy if the central instance is unavailable. In another example, the light instance may use portions of a security policy such as an automated acceptance of a client content segment if the received central instance policy received in step 360 comports with an expired security policy.

In some embodiments of the step 330, the security policy includes an indication of whether to serve, decline, quarantine, flag the content, or warn the client.

In some embodiments of the step 330, content-addressable memory (CAM) or associative memory techniques are used to determine a client content segment identifier based on the content of the client content segment.

In some embodiments of the step 330, a hash computation is applied on the client content segment to determine a hash value to use as the client content segment identifier. In some of these embodiments, the client content segment identifier is then used to retrieve a stored security policy from a table or database. It should be appreciated that the entry in the table or database may be a pointer to the actual security policy. In a further embodiment, entries in the table of the light instance contain a hash of the content, the id of the central instance that performed the evaluation, the time when the hash was last updated, or the last time any content matched the hash entry.

In some embodiments, the step 330 includes determining the client content segment identifier based on one or more of: (i) content; (ii) URL; (iii) any combination of Layer 2 or Layer 3 addresses, (iv) transport layer ports; (v) Universal Resource Identifiers (URI); (vi) the transport payload within a packet; (vii) the application layer headers (e.g., HTTP headers); (viii) the application payload (HTTP GET request/response); or (ix) the like. For example, a hash can be computed on any combination of such entities.

In some embodiments of the step 330, stored security policies become invalid after a period a time. In some of these embodiments, the light instance applies variable levels of timeouts for each client content segment entry.

In some embodiments of the step 330, the light instance uses a probability distribution function to determine when a security policy for a client content segment expires. The expiration probability may be a function of one or more of: (i) the age associated with the client content segment identifier; (ii) the source of the client content segment; (iii) the length of the timeout parameter; (iv) the security policy (e.g., the security rating or categorization of the security risk); or (v) the like.

In some embodiments of the step 350, the light instance sends an address/pointer of the client content segment to the central instance. For example, the address may be a URL of a web page or file.

In some embodiments of the step 350, the request to the central instance includes setting a special flag forcing the central instance to analyze the client content segment even if the central instance already has a stored central instance policy for that client content segment.

Figure 4:
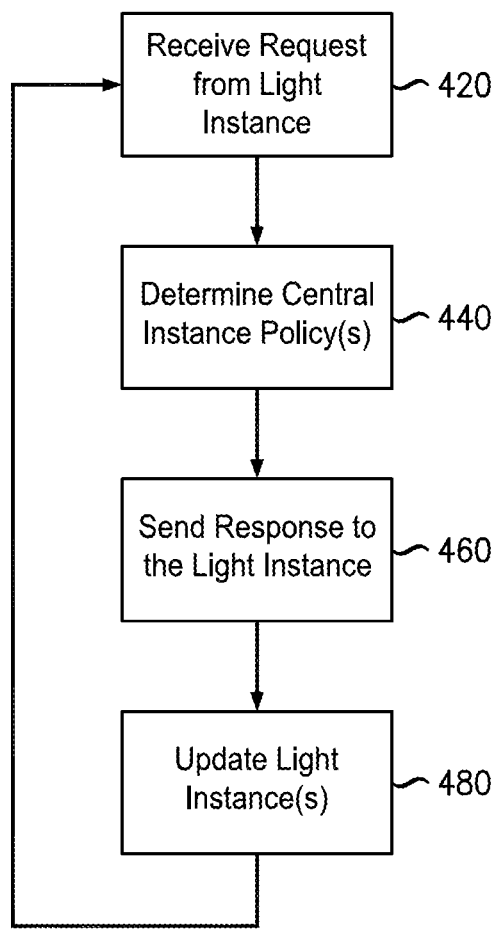
FIG. 4 depicts a flow chart illustrating an embodiment of a method 400 for a central instance (e.g., central instances 160 of FIG. 1) to analyze a client content segment as illustrated in step 240 of FIG. 2.

In some embodiments of the step 360, the central instance response includes one or more parameters as described in steps 440 and 460 of FIG. 4.

FIG. 4 depicts a flow chart illustrating an embodiment of a method 400 for a central instance (e.g., central instances 160 of FIG. 1) to analyze a client content segment as illustrated in step 240 of FIG. 2. The method includes receiving a request to analyze a client content segment (step 420), such as transmitted during step 350 in FIG. 3. The apparatus performing the method then analyzes the client content segment and determines a central instance policy(s) (step 440). The apparatus performing the method then optionally sends a central instance response to the light instance (step 460). The apparatus performing the method also updates one or more light instances based on the central instance policy(s) (step 480).

In the method 400, the step 420 includes receiving a request to analyze a client content segment as described above.

In the method 400, the step 440 includes analyzing the client content segment as described above and determining central instance policy(s). In particular, the complete security instance performs an analysis of the client content segment and the central instance policy(s) are based on the results of the analysis. For example, if the complete security instance performs an anti-virus check and determines that the client content segment contain a virus, a central instance policy may be to decline or quarantine the client content segment.

The method 400 optionally includes step 460. Step 460 includes sending a central instance response to the light instance. In particular, the request response includes the central instance policy(s) that are to be used by the requesting light instance to base a security policy upon for the client content segment.

In the method 400, the step 480 includes updating one or more light instances based on the central instance policy(s). In particular, an update message containing the central instance policy(s) determined in step 440 is sent to one or more light instances.

In some embodiments of the step 420, the request to analyze a client content segment includes an address of the client content segment. For example, the address may be a URL of a web page or file such as an image file. Advantageously, by sending an address instead of the client content segment, the system may require less network resources.

In some embodiments of the step 420, the request to analyze a client content segment includes a client content segment identifier. For example, if the central instance already has analyzed the client content segment, the client content segment may be identified by a client content segment identifier.

In some embodiments of the step 420, the request includes a flag to force the central instance to perform a complete analysis of the client content segment even if the central instance has a stored and valid corresponding central instance policy.

In some embodiments of the step 440, the central instance stores the determined central instance policy(s). In some of these embodiments, the central instance also stores a client content segment identifier corresponding to the central instance policy(s). In some embodiments, if the client content segment corresponding to the received request has a stored central instance policy(s) (i.e., has been previously analyzed), then the determined central instance policy(s) may be retrieved from storage without analyzing the client content segment again. In some of these embodiments, the central instance policy(s) includes an expiration parameter. If the expiration parameter expires, the central instance policy(s) is no longer valid and the central instance will perform a complete security analysis of the client content segment.

In some of these embodiments of the step 440, the expiration parameter may be based on one or more of: (i) trustworthiness of the source of the content (e.g., nytimes.com content may be trusted for a longer expiration than piratebay.org); (ii) proportion of dynamic content served from the source (e.g., youtube.com has more dynamic content than whitehouse.gov, so youtube.com may have a smaller expiration); (iii) load on the central instance(s); and (iv) the like.

In some embodiments of the step 440, the central instance policy(s) include one or more of: (i) a security policy to apply to the client content segment; (ii) information or warnings of the potential security risk; (iii) a categorization of the security risk (e.g., virus, adware, or Trojan); (iv) a status of the content (e.g., benign or malicious); (v) a security risk rating; (vi) a description of the security risk (e.g., the specific type or virus); or (vii) the like.

In some embodiments of the step 460 or step 480, the request response includes one or more of: (i) a client content segment identifier; (ii) central instance policy(s); (iii) an expiration parameter of one or more of the central instance policy(s); (iv) a categorization of the type of content characterizing the client content segment; or (v) the like.

In some embodiments of the step 460 or step 480, the client content segment identifier is a hash computation of the client content segment as described above.

In some embodiments, the steps 460 and 480 are performed at the same time. For example, the update message sent in step 480 may be used by the light instance sending the request to base a security policy upon for the client content segment.

In some embodiments, the step 480 includes updating a subset of the light instances. In some of these embodiments, the determination of the subset of light instances to update is based upon a categorization of the type of content of the client content segment. For example, for client content segments categorized as WAP content, the central instance may only update light instances serving wireless networks. In another example, for client content segments categorized as being geographically specific, the central instance may only update light instances serving those geographic areas.

Figure 5:
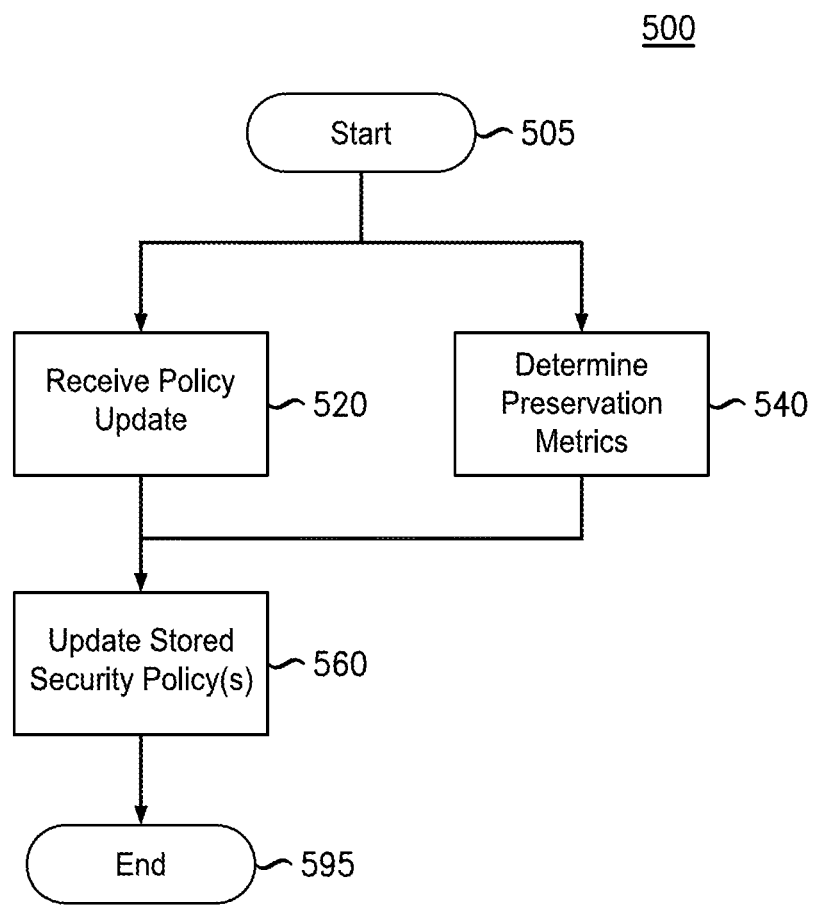
FIG. 5 depicts a flow chart illustrating an embodiment of a method 500 for a light instance (e.g., one of light instances 140 of FIG. 1) to update a stored security policy(s) corresponding to a client content segment.

FIG. 5 depicts a flow chart illustrating an embodiment of a method 500 for a light instance (e.g., one of light instances 140 of FIG. 1) to update a stored a security policy(s) corresponding to a client content segment. The method 500 includes updating the stored security policy(s) (step 560) based on receiving an update message (step 520) from a central instance (e.g., central instance 160 of FIG. 1), such as sent during step 480 in FIG. 4, or determining preservation metrics (step 540).

The method 500 optionally includes step 520. Step 520 includes receiving an update message (step 520) from a central instance (e.g., central instance 160 of FIG. 1) such as sent during step 480 in FIG. 4.

The method 500 optionally includes step 540. Step 540 includes determining preservation metrics. In particular, expiration parameters are determined for one or more of the stored security policy(s) and applied to delete stored security policy(s) or force an analyzation request (e.g., step 350 of FIG. 3) to be sent to the central instance even if the light instance has a stored security policy (i.e., stored, but no longer valid).

In the method 500, step 560 includes updating the stored security policy(s) based on the received policy update or the determined update metrics (step 560). In particular, tables, databases or any other suitable storage mechanisms are updated to include the updated storage policy, the client content segment identifier or any other suitable information as described herein.

In some embodiments of the step 540, stored security policies or their associated data (e.g., entries in a table or database) may be deleted. Advantageously, by deleting older stored security policies or their associated data, storage space and light-weight instance processing time may be decreased. In some of these embodiments, the security policy(s) or its associated data is deleted based on one or more of: (i) the occupied storage space occupied by the data; (ii) the categorization, geography or source of the client content segment; (iii) a determination of the probability that the client content segment will be received in the future; (iv) expiration parameters; or (v) the like.

In some of these embodiments, a determination of the probability that a client content segment will be received in the future is based on a history of prior received client content segments.

Although primarily depicted and described in a particular sequence, it should be appreciated that the steps shown in methods 200, 300, 400 and 500 may be performed in any suitable sequence. Moreover, the steps identified by one step may also be performed in one or more other steps in the sequence or common actions of more than one step may be performed only once.

It should be appreciated that steps of various above-described methods can be performed by programmed computers. Herein, some embodiments are also intended to cover program storage devices, e.g., data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable data storage media. The embodiments are also intended to cover computers programmed to perform said steps of the above-described methods.

Figure 6:
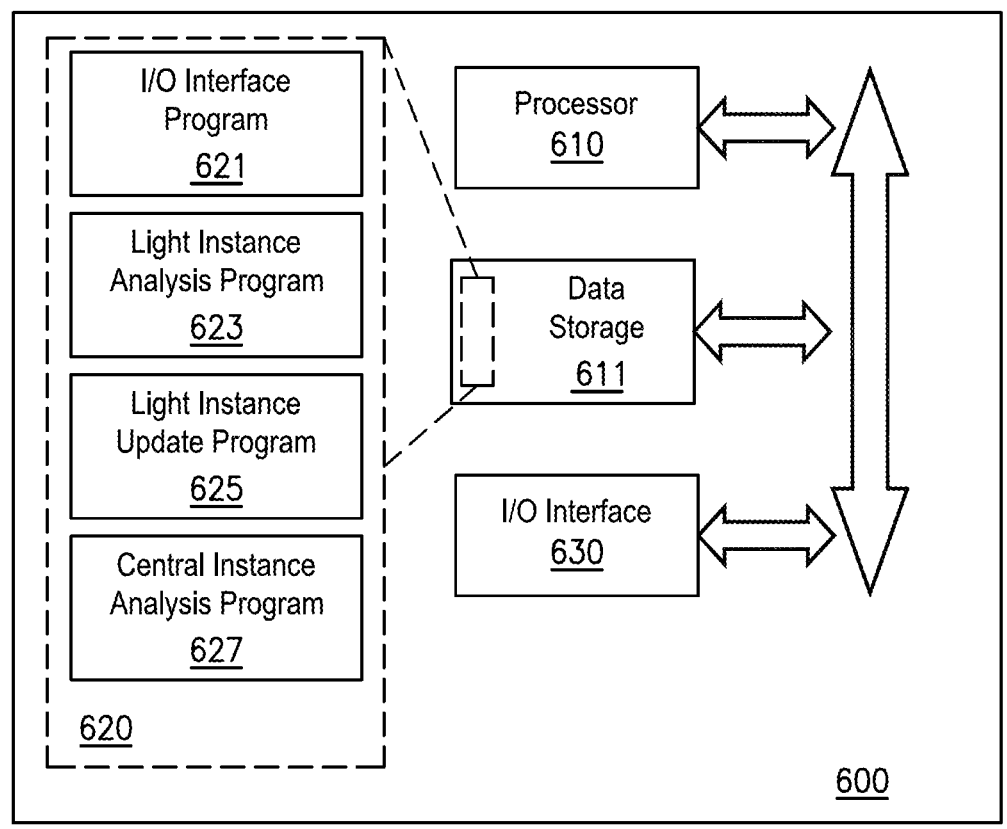
FIG. 6 schematically illustrates an embodiment of various apparatus 600 such as one of light instances 140 of FIG. 1, or central instance 160 of FIG. 1.

FIG. 6 schematically illustrates an embodiment of various apparatus 600 such as one of light instances 140 of FIG. 1, or central instance 160 of FIG. 1. The apparatus 600 includes a processor 610, a data storage 611, and an I/O interface 630.

The processor 610 controls the operation of the apparatus 600. The processor 610 cooperates with the data storage 611.

The data storage 611 may store program data such as security policies and their associated data, central instance policies or the like as appropriate.

The data storage 611 also stores programs 620 executable by the processor 610.

The processor-executable programs 620 may include an I/O interface program 621, a light instance analysis program 623, a light instance update program 625, or a central instance analysis program 627. Processor 610 cooperates with processor-executable programs 620.

The I/O interface 630 cooperates with processor 610 and I/O interface program 621 to support communications over communications channels 125, 145 or 165 of FIG. 1 as appropriate and as described above.

The light instance analysis program 623 performs the steps of method 300 of FIG. 3 as described above.

The light instance update program 625 performs the steps of method 500 of FIG. 5 as described above.

The central instance analysis program 627 performs the steps of method 400 of FIG. 4 as described above.

In some embodiments, the processor 610 may include resources such as processors/CPU cores, the I/O interface 630 may include any suitable network interfaces, or the data storage 611 may include memory or storage devices. Moreover the apparatus 600 may be any suitable physical hardware configuration such as: one or more server(s), blades consisting of components such as processor, memory, network interfaces or storage devices. In some of these embodiments, the apparatus 600 may include cloud network resources that are remote from each other.

In some embodiments, the apparatus 600 may be virtual machine. In some of these embodiments, the virtual machine may include components from different machines or be geographically dispersed. For example, the data storage 611 and the processor 610 may be in two different physical machines.

When processor-executable programs 620 are implemented on a processor 610, the program code segments combine with the processor to provide a unique device that operates analogously to specific logic circuits.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively coupled to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory(s), storage(s), and database(s).

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated that any block diagrams herein represent conceptual views of illustrative circuitry embodying the principles of the invention. Similarly, it should be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus for providing a security service, the apparatus comprising:
   a data storage; and
   a processor communicatively coupled to the data storage, the processor being configured to:
   store a plurality of security policies corresponding to a plurality of client content segments in the data storage;
   receive a first client content segment;
   determine a first client content segment identifier based on the content of the first client content segment;
   select a first security policy from the plurality of security policies based on the first client content segment identifier;
   apply the first security policy to the first client content segment;
   receive a second client content segment;
   determine a second client content segment identifier based on the content of the second client content segment;
   determine that the plurality of security policies does not contain a valid security policy for the second client content segment based on the second client content segment identifier; and
   send a security analysis request to a central instance in response to the determination that the plurality of security policies does not contain the valid security policy;
   wherein the first security policy is based on a first security risk associated with the content of the first client content segment and the valid security policy is associated with a second security risk associated with the content of the second client content segment.

2. The apparatus of claim 1, wherein the first security policy comprises at least one of admit, decline or quarantine the first client content segment.

3. The apparatus of claim 1, wherein the determination of the first client content segment identifier comprises configuring the processor to:
apply a hash computation on the first client content segment.

4. The apparatus of claim 1, wherein the application of the first security policy comprises configuring the processor to:
send a client a message based on the first security policy.

5. The apparatus of claim 1, wherein the application of the first security policy comprises configuring the processor to:
send a client a message based on the first security policy;
receive a client response; and
admit or decline the client content segment based on the client response;
wherein the first security policy comprises a warning of a potential security risk.

6. The apparatus of claim 1, wherein the processor is further configured to:
divide the first client content segment into a plurality of divided first client content segments;
wherein the first client content segment identifier corresponds to one of the plurality of divided first client content segments.

7. The apparatus of claim 6, wherein the division of the first client content segment is based on dynamic content.

8. The apparatus of claim 1, wherein the processor is further configured to:
receive a central instance response from the central instance;
determine a second security policy based on the central instance response;
apply the second security policy to the second client content segment; and
update the plurality of security policies based on the second security policy;
wherein the second security policy is based on the second security risk.

9. The apparatus of claim 1, wherein the processor is further configured to:
apply an expiration policy on the plurality of security policies; and
further base the determination that the plurality of security policies does not contain the valid security policy based on the expiration policy.

10. The apparatus of claim 9, wherein the expiration policy is based on the source of the second client content segment.

11. The apparatus of claim 1, wherein the processor is further configured to:
receive an update message from the central instance; and
update the plurality of security policies based on the update message.

12. The apparatus of claim 1, wherein the processor is further configured to:
update the plurality of security policies based on one or more preservation metrics, the one or more preservation metrics comprising at least one of:
an occupied storage space of plurality of security policies in the data storage;
a geographic categorization of the client content segment corresponding to the plurality of security policies;
a source of the client content segment corresponding to the plurality of security policies; and
a determination of the probability that the client content segment corresponding to the plurality of security policies will be received in the future.

13. An apparatus for providing a security service, the apparatus comprising:
a data storage; and
a processor communicatively coupled to the data storage, the processor being configured to:
receive a request to analyze a client content segment;
perform a security analysis of the client content segment;
determine a central instance policy based on the security analysis;
determine a plurality of light instances; and
transmit an update message to the plurality of light instances, the update message comprising the central instance policy;
wherein the central instance policy is based on a first security risk associated with the content of the client content segment.

14. The apparatus of claim 13, wherein the central instance policy comprises at least one of:
a security policy to apply to the client content segment; and
a security risk of the client content segment.

15. The apparatus of claim 13, wherein the security risk is a security risk rating.

16. The apparatus of claim 13, wherein the determination of the plurality of light instances is based on a categorization of the content of the client content segment.

17. The apparatus of claim 13, wherein the determination of the plurality of light instances is based on a plurality of geographic locations corresponding to the plurality of light instances.

18. The apparatus of claim 13, wherein the update message further comprises at least one of:
a client content segment identifier corresponding to the client content segment;
an expiration parameter corresponding to the central instance policy; and
a content type of the client content segment.

19. A system for providing a security service, the system comprising:
a plurality of light instances;
a central instance communicatively coupled to the plurality of light instances;
the plurality of light instances configured to:
store a plurality of security policies corresponding to a plurality of client content segment;
receive a first client content segment;
determine a first client content segment identifier based on the content of the first client content segment;
select a first security policy from the plurality of security policies based on the first client content segment identifier;
apply the first security policy to the first client content segment;
receive a second client content segment;
determine a second client content segment identifier based on the content of the second client content segment;
determine that the plurality of security policies does not contain a valid security policy for the second client content segment based on the second client content segment identifier;
send a security analysis request to the central instance in response to the determination that the plurality of security policies does not contain the valid security policy;

receive a central instance response from the central instance;

determine a second security policy based on the central instance response;

apply the second security policy to the second client content segment; and update the plurality of security policies based on the second security policy; and the central instance being configured to:

receive the security analysis request;

perform a security analysis of the second client content segment;

determine a central instance policy based on the security analysis;

determine a plurality of light instances; and transmit an update message to the plurality of light instances, the update message comprising the central instance policy;

wherein the first security policy is based on a first security risk associated with the content of the first client content segment and the valid security policy is associated with a second security risk associated with the content of the second client content segment; and wherein the second security policy is based on the second security risk.

20. A method for providing a security service, the method comprising:

at a processor communicatively coupled to a data storage, storing a plurality of security policies corresponding to a plurality of client content segment in the data storage;

receiving, by the processor in cooperation with the data storage, a first client content segment;

determining, by the processor in cooperation with the data storage, a first client content segment identifier based on the content of the first client content segment;

selecting, by the processor in cooperation with the data storage, a first security policy from the plurality of security policies based on the first client content segment identifier;

applying, by the processor in cooperation with the data storage, the first security policy to the first client content segment;

receiving, by the processor in cooperation with the data storage, a second client content segment;

determining, by the processor in cooperation with the data storage, a second client content segment identifier based on the content of the second client content segment;

determining, by the processor in cooperation with the data storage, that the plurality of security policies does not contain a valid security policy for the second client content segment based on the second client content segment identifier;

sending, by the processor in cooperation with the data storage, a security analysis request to a central instance in response to the determination that the plurality of security policies does not contain the valid security policy;

receiving, by the processor in cooperation with the data storage, a central instance response from the central instance;

determining, by the processor in cooperation with the data storage, a second security policy based on the central instance response;

applying, by the processor in cooperation with the data storage, the second security policy to the second client content segment; and updating, by the processor in cooperation with the data storage, the plurality of security policies based on the second security policy;

wherein the first security policy is based on a first security risk associated with the content of the first client content segment and the valid security policy is associated with a second security risk associated with the content of the second client content segment; and wherein the second security policy is based on the second security risk.

21. The method of claim 20, wherein the first security policy comprises at least one of admit, decline or quarantine the first client content segment.

22. The method of claim 20 wherein the step of determining the first client content segment identifier comprises applying a hash computation on the first client content segment.

* * * * *